United States Patent [19]

Wilson et al.

[11] Patent Number: 4,487,712
[45] Date of Patent: Dec. 11, 1984

[54] GELATION STABILIZED WATER-SOLUBLE SILICATES

[75] Inventors: Joe C. Wilson, Woodhaven; Pauls Davis, Gibraltar, both of Mich.

[73] Assignee: BASF Wyandotte Corporation, Wyandotte, Mich.

[21] Appl. No.: 498,147

[22] Filed: May 25, 1983

[51] Int. Cl.$^3$ .......................... C09K 5/00; C23F 11/00; C22F 11/12
[52] U.S. Cl. ..................... 252/78.3; 252/73; 252/74; 252/76; 252/79; 422/13; 422/17; 422/19; 252/389 R; 252/400 R
[58] Field of Search ............ 252/78.3, 76, 73, 79, 252/74, 400, 3, 400.31, 400.32, 400.41, 400.5, 400.51, 400.52, 400.53, 400.54, 400.6, 400.61, 400.62, 387.3, 387.31, 387.32, 387.4, 387.41, 387.5, 387.51, 387.53, 387.54, 387.6, 387.61, 387.62

[56] References Cited

U.S. PATENT DOCUMENTS

| 3,720,611 | 3/1973 | Britt | 252/400.31 X |
|---|---|---|---|
| 3,766,077 | 10/1973 | Hwa et al. | 422/17 X |
| 3,992,318 | 11/1976 | Gaupp et al. | 422/17 X |
| 4,149,985 | 4/1979 | Wilson | 252/75 X |
| 4,176,059 | 11/1979 | Suzuki | 422/19 X |
| 4,241,014 | 12/1980 | Hirozawa et al. | 252/76 X |
| 4,287,077 | 9/1981 | Wing | 252/75 |
| 4,352,742 | 10/1982 | Davis et al. | 252/73 X |
| 4,392,972 | 7/1983 | Mohr et al. | 422/13 X |
| 4,404,114 | 9/1983 | Mohr et al. | 252/389.31 X |

FOREIGN PATENT DOCUMENTS 2027033  3/1977  Japan ..................... 422/19

*Primary Examiner*—John E. Kittle
*Assistant Examiner*—Mukund J. Shah
*Attorney, Agent, or Firm*—David L. Hedden; Joseph D. Michaels

[57] ABSTRACT

Gelation resistant alcohol compositions containing water-soluble silicates are obtained by the use of effective silicate gelation stabilizing amounts of at least one of a polymer of acrylic acid, alkaline earth metal and alkaline earth metal salts thereof; a sugar alcohol; and a water-soluble salt of molybdic, tungstic, or selenic acids.

11 Claims, No Drawings

GELATION STABILIZED WATER-SOLUBLE SILICATES

BACKGROUND OF THE INVENTION

1. Field of the Invention

This invention relates to aqueous alcohol compositions containing a water-soluble silicate stabilized against gelation.

2. Prior Art

Organo siloxane-silicate copolymers have been disclosed as useful for inhibiting the corrosion of metals in contact with aqueous liquids in Kanner et al. in U.S. Pat. No. 3,507,897; Pines in U.S. Pat. No. 3,341,469; Bailey in U.S. Pat. No. 2,968,643; and in Davis et al. in U.S. Pat. Nos. 4,352,742; 4,354,002; and 4,362,644.

Wing, in U.S. Pat. No. 4,287,077, has disclosed a gelation resistant aqueous glycol composition useful as an antifreeze composition in which gelation resistance is obtained by the addition of an effective gelation stabilizing amount of a glycol soluble ether modified silicone. The use of the gelation stabilizers of the invention in the gelation stabilization of aqueous alcohol compositions containing a water-soluble silicate has not been disclosed in the prior art.

SUMMARY OF THE INVENTION

Novel aqueous compositions are disclosed which contain a water-soluble silicate stabilized against gelation utilizing a polymer of acrylic acid, the alkali or alkaline earth metal salts thereof; a sugar alcohol; or a water-soluble salt of an acid selected from the group consisting of molybdic, tungstic, and selenic acids. These compositions are useful for inhibiting the corrosion of metals below sodium in the electromotive series that come in contact with aqueous liquids, particularly aqueous alcohol compositions. The novel compositions of the invention provide improved long-term gelation stabilization of water-soluble silicates in aqueous media.

DETAILED DESCRIPTION OF THE INVENTION

The use of the gelation-stabilizing additives of this invention in an aqueous media in combination with a water-soluble silicate provides a means of stabilizing the gel-forming tendencies of said silicates. The aqueous media can be, for instance, an alcohol solution such as a solution of ethylene glycol which is commonly utilized in the preparation of antifreeze compositions. As the result of the long-term retention of the water-solubility properties of the water-soluble silicate, an aqueous alcohol solution containing said silicate is remarkably less corrosive than a non-stabilized water-soluble silicate utilized as a corrosion inhibitor in an aqueous alcohol antifreeze composition.

The useful water-soluble silicates are derived from silicates having the formula

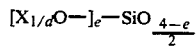

wherein X is a cation that forms a water-soluble silicate, preferably selected from the group consisting of at least one of an alkali metal, ammonium, and tetraorganoammonium cation; d is the valance of the cation represented by X and has a value of at least one; and e has a value of from 1 to 3. Most preferably, X is inorganic and selected from the group consisting of sodium, potassium, lithium and rubidium.

Representative useful water-soluble silicates for use in the aqueous alcohol compositions of the invention are represented by the alkali metal orthosilicates, the alkali metal metasilicates, the alkali metal tetrasilicates, the alkali metal disilicates, and the tetra(organo)ammonium silicates. Specific examples of silicates under each class of the above silicates are potassium metasilicate, sodium orthosilicate, potassium disilicate, lithium orthosilicate, lithium metasilicate, lithium disilicate, rubidium disilicate, rubidium tetrasilicate, mixed alkali metal silicates, ammonium silicate, tetra(ethyl)ammonium silicate, phenyltrimethyl ammonium silicate, benzyltrimethyl ammonium silicate, guanidine silicate, and tetra(hydroxyethyl)ammonium silicate. The preferred silicates are sodium and potassium silicates, especially sodium metasilicate and potassium metasilicate. Generally the aqueous alcohol compositions of the invention contain about 0.1 to about 0.8 percent by weight of a water-soluble silicate based upon the weight of the alcohol component of the composition. Preferably about 0.15 to about 0.5 percent by weight, and most preferably about 0.2 to about 0.4 percent by weight, based upon the weight of the alcohol, of water-soluble silicate is utilized.

The gelation stabilizing additives of the invention can be a polymer of acrylic acid and the alkali and alkaline earth metal salts thereof; a sugar alcohol; or a water-soluble salt of molybdic, tungstic, or selenic acids such as the alkali metal and alkaline earth metal salts thereof. The gelation stabilizing additive is used in the amount of about 0.01 percent to about 0.5 percent by weight based upon the weight of the alcohol. Preferably about 0.03 percent to about 0.2 percent by weight, and most preferably about 0.05 percent to about 0.1 percent by weight are used based upon the weight of the alcohol.

The alcohol utilized as a freezing point depressant in the antifreeze compositions of the invention can be any suitable water-soluble liquid alcohol used heretofore in formulating antifreeze compositions. The water-soluble alcohol can contain 1 to about 4 carbon atoms and 1 to about 3 hydroxy groups. Ethylene glycol is preferred as the freezing point depressant and especially the commercially available mixtures containing a major amount of ethylene glycol and a minor amount of diethylene glycol. The commerical mixture generally contains at least 85 to 95 percent by weight of ethylene glycol with the remainder being diethylene glycol and small amounts of substances which are incidentally present such as water. Other water-soluble liquid alcohols can be admixed with ethylene glycol but such mixtures usually are not preferred. Inexpensive commercially available water-soluble alcohols can also be used such as methyl, ethyl, propyl, and isopropyl alcohol alone or in mixtures.

A polymer of acrylic acid with the alkali metal or alkaline earth metal salts thereof which is useful as a gelation stabilizing additive in the compositions of the invention can be prepared by any suitable method of polymerization. Generally such a polymer has a molecular weight in the range of about 1000 to about 5000, preferably about 1500 to about 2500.

The solution polymerization of acrylic acid can be carried out in water by heating the aqueous monomer in the presence of an initiator, such as hydrogen peroxide, potassium persulfate, or acetyl peroxide, or by initiating a redox polymerization at reduced temperature with a system composed of potassium persulfate and sodium thiosulfate as the oxiding-reducing pair. Molecular weight can be controlled by the use of a special chain regulating system consisting of sodium hypophosphite and copper acetate as well as by conventional means. Polymerization of acrylic acid in organic solvents such as methanol and dioxane can be accomplished by the use of initiators such as azobisisobutyronitrile at elevated temperatures. The solution polymerization of acrylic acid in such solvents as benzene and n-hexane can be accomplished with an initiator, such as benzoyl peroxide, at elevated temperatures to produce an insoluble polymer which can be removed from the reaction medium by filtration.

The bulk polymerization of acrylic acid can be carried out by carefully warming the monomer containing benzoyl peroxide, but care must be taken to prevent a runaway polymerization since there is no solvent present to absorb the heat of polymerization.

The aqueous solution polymerization of salts of acrylic acid, such as sodium and calcium acrylate, can be carried out by thermal or redox free radical techniques. It has been demonstrated that the copolymerization of sodium acrylate containing minor proportions of calcium acrylate proceeds at a more rapid rate and to a higher molecular weight than the polymerization of either monomer alone.

The salts of poly(acrylic acid) can also be prepared by reactions on preformed acrylic acid polymer. For instance, neutralization of homopolymers of acrylic acid as well as copolymers containing acrylic acid units can be carried out with inorganic and organic bases to produce suitable products.

A sugar alcohol constitutes a second class of gelation stabilizing additive for water-soluble silicates which are useful in the aqueous alcohol compositions of the invention. The term "sugar alcohol" is often used to denote a group of polyhydric alcohols obtained by reduction of carbohydrates. These polyhydric alcohols are closely related to the simple sugars from which their names are derived and contain straight carbon chains, each carbon atom bearing a hydroxyl group. Useful sugar-alcohols have the general formula:

$$HOCH_2(CHOH)_nCH_2OH$$

where n is an integer of 2 to 5. The sugar alcohols are classifed in accordance with the number of hydroxyl groups as tetritols, pentitols, hexitols, heptitols, etc. Each of these classes contains steroisomers. Of the straight-chain polyhydric sugar alcohols, sorbitol and mannitol are of greatest industrial significance. Representative useful sugar alcohols are erythritol, ribitol, xylitol, allitol, sorbitol, mannitol, glycero-gulo-heptitol and octitol. Of these sugar alcohols, sorbitol and mannitol are preferred because of their commercial availability.

Sorbitol can be synthesized commercially utilizing high-pressure hydrogenation of glucose or by the electrolytic reduction of glucose. Chemical reduction of glucose to sorbitol can be achieved by means of sodium amalgam or by reduction with cyclohexanol or tetrahydrofurfuryl alcohol in the presence of Raney nickel. Reduction of d-fructose results in both sorbitol and mannitol. Hydrolysis and hydrogenation of sucrose or hydrogenation of invert sugar also results in the formation of sorbitol and mannitol. Sorbitol can also be obtained by simultaneous hydrolysis and hydrogenation of starch. Mannitol can also be obtained by extraction from seaweed in a commercial process which is of lesser importance.

A third class of gelation stabilizing additive is a water-soluble salt of an acid selected from the group consisting of molybdic, tungstic, and selenic acids. Any salt of these acids which is readily soluble in water is a useful gelation inhibitor for use in the alcohol compositions of the invention to retard the gelation of water-soluble silicates.

The water-soluble molybdates are preferred. Both alkali-metal and alkaline earth metal molybdates as well as ammonium molybdate are useful. The term "alkali molybdate" is used herein in a broad sense so as to include alkali metal, alkaline earth metal, and ammonium molybdates. Representative examples of useful water-soluble molybdates are sodium molybdate, potassium molybdate, lithium molybdate, and ammonium molybdate including ammonium dimolybdate and ammonium heptamolybdate. Preferably, sodium and potassium molybdate are used because of their availability and compatibility with the aqueous alcohol compositions of the invention. The proportion, for instance, of the water-soluble molybdate utilized to inhibit gelation of water-soluble silicates can vary depending upon the degree of hardness of the aqueous system, the temperature to which the system is exposed and the amount of dissolved oxygen in said system. Proportions of a water-soluble molybdate above 0.5 percent by weight based upon the weight of the alcohol component of the aqueous alcohol composition normally do not provide significant improvements in the gelation stabilizing properties of the aqueous alcohol composition containing a water-soluble silicate.

The aqueous alcohol compositions of the invention are generally useful as antifreeze compositions to provide heat transfer and the protection of metals that come in contact with the metal components of a heat transfer system. Other suitable aqueous systems, which can include or omit an alcohol component, are aqueous solutions containing inorganic solute such as aqueous solutions of sodium or potassium chloride, refrigerating solutions, corrosive well water or river water containing chlorides, carbonates, and sulfates which can be used as process or cooling water in industry, and the like.

Where an alcohol is not a component of the heat transfer liquid utilized, the proportions of silicate and gelation stabilizing inhibitor are based upon the weight of the aqueous component. Heat transfer systems containing water and a water-soluble organic liquid can include in addition to the usual polyhydric alcohol such as ethylene glycol or monohydric alcohol such as ethanol or propanol, such compounds as sulfoxides, for instance, methyl sulfoxide, formamides, for instance, dimethylformamide, or cyclic ethers free of olefinic unsaturation, for instance, tetrahydrofuran, dioxane, and the like. Suitable heat transfer compositions containing water and a water-soluble organic liquid generally contain at least 0.1 percent by weight of water, or preferably at least about 5 percent by weight of water based upon the total weight of water and organic liquid.

The aqueous alcohol compositions of this invention containing a silicate stabilized against gelation are remarkably useful as antifreezes and coolants for the cooling system of an internal combustion engine. Such antifreeze compositions are generally inhibited aqueous alcohol solutions containing relatively large amounts of water.

The antifreeze concentrates used in preparing the antifreeze, or coolant, compositions are adapted to enconomical shipment and storage. In practice, the antifreeze concentrates are shipped to the point where they are used subsequent to dilution with additional water. Water imparts desirable properties to both the antifreeze concentrate and the antifreeze coolant composition. Large amounts of water impart good heat transfer properties to the coolant compositions. Generally, the coolant compositions contain about 1 percent by weight to about 900 percent by weight of water based upon the weight of the antifreeze concentrate composition. Preferably, the antifreeze coolant compositions contain about 30 to about 900 percent by weight of water based upon the weight of the concentrate. The relative amount of water and alcohol in the coolant compositions can be varied to adjust the freezing point of the compositions by the desired amount. Generally, the antifreeze concentrates contain from 0.1 percent to about 10 percent by weight of water, preferably about 2 percent to about 5 percent by weight of water based upon the weight of said concentrate.

Various additives can be added to the aqueous alcohol compositions in the invention so as to impart special properties thereto. For instance, anti-foam agents, identifying dyes, pH indicators, conventional metal corrosion inhibitors, metal sealants which prevent leakage of the coolant from the cooling system, anti-creep agents which prevent seepage of the coolant into the crankcase of the engine and the like can be added to these compositions as will be apparent to one skilled in this art.

Useful anti-foam agents are alkoxylated nonionic surfactants which exhibit low-foaming characteristics, for instance, polyoxyalkylene adducts of hydrophobic bases, as illustrated by PLURONIC® L-61. Such surfactants are prepared by condensing a hydrophobic base with an alkylene oxide such as ethylene oxide. Typical hydrophobic bases are the mono- and polyalkylphenols.

Conventional corrosion inhibitors and/or alkaline pH buffers useful in the compositions of the invention include water-soluble metal salts such as the alkali metal carbonates, borax, the alkali metal dichromates, the alkali metal phosphates, the alkali metal salts of benzoic or toluic acid, the alkali metal salts of phenol, benzotriozole, or tolyltriazole, lower alkanol amines ($C_2$-$C_6$), for instance, triethanolamine, alkali metal nitrates, alkali metal nitrites, and alkali metal mercaptobenzothiazoles. Generally such conventional corrosion inhibitors are used in the amount of about 0.03 percent to about 5 percent by weight, preferably about 0.1 percent to about 2 percent by weight based upon the total weight of the alcohol in the antifreeze concentrate.

The aqueous alcohol compositions of the invention are generally useful in contact with all metals and alloys that are used in industrial processes and apparatus. Metals, the corrosion of which is retarded by the compositions of this invention, include the metals below sodium in the electromotive series, for instance, magnesium, aluminum, copper, iron, manganese, nickel, lead, silver, tin, beryllium, and zinc, as well as the alloys of such metals such as brass, bronze, solder alloys, steel and the like. Such metals normally become corroded when in prolonged contact with water, particularly when the water is at elevated temperatures and/or contains electrolytes. The aqueous alcohol compositions of the invention are particularly useful in the protection of solder alloys, brass, iron, copper, and aluminum.

The aqueous alcohol concentrates of the invention are prepared by first dissolving in a water-alcohol blend, preferably a major proportion of ethylene glycol in admixture with a minor proportion of diethylene glycol, a water-soluble silicate and a gelation stabilizer. The composition can be rendered basic by the addition of an alkali such as sodium or potassium hydroxide to obtain a pH which is generally greater than 7 in order to minimize corrosion of metals with which the compositions come in contact. Generally the pH of the aqueous alcohol concentrate or coolant composition is about 8 to about 12, preferably about 8 to about 11, and most preferably about 8.5 to about 10. The pH can be maintained within the above ranges by the addition of conventional pH buffers, for instance, salts of strong bases and weak acids, as are disclosed in U.S. Pat. No. 3,121,692, incorporated herein by reference.

In order to evaluate the retardation of gelation of silicates in aqueous alcohol solutions, said solutions containing the silicate gelation stabilizing additives of this invention were stored in closed containers at a temperature of 140° F. for varying times until gelation occurred. The aqueous alcohol solutions evaluated contained sodium silicate having a 1.8 weight ratio of silicon dioxide/sodium oxide, various amounts of a gelation stabilizing additive, 95 parts by weight of antifreeze grade ethylene glycol, and 4.5 parts by weight of water. The compositions were adjusted to either pH 8 or pH 10 and stored, as indicated above, until gelation occurred.

The following examples illustrate the various aspects of the invention but are not intended to limit its scope. Where not otherwise specified throughout this specification and claims, temperatures are given in degrees centigrade and parts, percentages and proportions are by weight.

EXAMPLES 1-6

Utilizing the procedure and proportions set forth in the description of the test method above, representative gelation stabilizing additives and sodium silicate were utilized in the proportions indicated in the following table. The proportions indicated of sodium silicate were calculated as anhydrous $Na_2SiO_3$.

EXAMPLES 7 and 8

(Control samples—forming no part of this invention)

Utilizing the procedure and proportions set forth above in the description of the test method, comparable proportions of sodium silicate (calculated as anhydrous $Na_2SiO_3$) were evaluated omitting the gelation stabilizing additive. The time to gelation, the proportion of sodium silicate, and the pH of each of these aqueous alcohol compositions is disclosed in the following table.

TABLE

Aqueous Alcohol Compositions Containing Silicate Stabilized Against Gelation

| Example | Gel Stabilizing Additive (%) Weight | Sodium Silicate (%) Weight | pH | Gel Time (Days) |
|---|---|---|---|---|
| 1 | Sodium molybdate | 0.05 | 0.4 | 8 | 4 |
| 2 | Sodium molybdate | 0.05 | 0.4 | 10 | 32 |
| 3 | Mannitol | 0.05 | 0.4 | 8 | 11 |
| 4 | Mannitol | 0.05 | 0.4 | 10 | 32 |
| 5 | Poly(acrylic acid)* | 0.10 | 0.4 | 8 | 9 |
| 6 | Poly(acrylic acid)* | 0.10 | 0.4 | 10 | 29 |
| 7 | (Control) | | 0.3 | 8 | 4 |

TABLE-continued
Aqueous Alcohol Compositions Containing Silicate Stabilized Against Gelation

| Example | Gel Stabilizing Additive (%) Weight | Sodium Silicate (%) Weight | pH | Gel Time (Days) |
| --- | --- | --- | --- | --- |
| 8 | (Control) | 0.3 | 10 | 7 |

*Average molecular weight 2000

While this invention has been described with reference to certain specific embodiments, it will be recognized by those skilled in the art that many variations are possible without departing from the scope and spirit of the invention and it will be understood that it is intended to cover all changes and modifications of the invention disclosed herein for the purposes of illustration which do not constitute departure from the spirit and scope of the invention.

The embodiments of the invention in which an exclusive privilege or property is claimed are defined as follows:

1. A gelation-resistant composition comprising a major amount of an alcohol, a corrosion inhibiting amount of at least one water-soluble silicate represented by the formula:

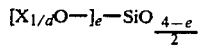

wherein X is a cation that forms a water-soluble silicate, d is the valence of the cation represented by X and has a value of at least one, and e has a value of 1 to 3 inclusive; and an effective silicate gelation stabilizing amount of a gelation inhibitor selected from the group consisting of at least one of a polymer of acrylic acid and the alkali metal and alkaline earth metal salts thereof; at least one of a sugar alcohol; at least one of a water-soluble salt of an acid selected from the group consisting of, tungstic and selenic acids; and mixtures thereof.

2. The composition of claim 1 wherein X is a cation selected from the group consisting of an alkali metal, ammonium, and tetraorganoammonium cations and said polymer of acrylic acid has an average molecular weight of about 1000 to about 5000.

3. The composition of claim 2 wherein said polymer of acrylic acid is in the form of the alkali metal salt thereof.

4. The composition of claim 1 wherein said sugar alcohol is selected from the group consisting of mannitol, sorbitol, and mixtures thereof and said alcohol comprises ethylene glycol.

5. The process of inhibiting the corrosion of metals below sodium in the electromotive series that come in contact with an aqueous liquid comprising a major amount of an alcohol, said process comprising adding to said liquid at least one water-soluble silicate represented by the formula:

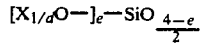

wherein X is a cation that forms a water-soluble silicate, d is the valence of the cation represented by X and has a value of at least one, and e has a value of 1 to 3 together with an effective silicate gelation stabilizing amount of a gelation inhibitor selected from the group consisting of at least one of a polymer of acrylic acid and the alkali metal or alkaline earth metal salts thereof; at least one of a water-soluble salt of an acid selected from the group consisting of, tungstic and selenic acids; at least one of a sugar alcohol; and mixtures thereof.

6. The process of claim 5 wherein X is a cation selected from the group consisting of an alkali metal, ammonium, and tetraorganoammonium cations and said gelation inhibitor is selected from the group consisting of a polymer of acrylic acid having a molecular weight of about 1000 to about 5000 and said alcohol comprises ethylene glycol.

7. The process of claim 5 wherein said gelation inhibitor is a sugar alcohol selected from the group consisting of mannitol, sorbitol, and mixtures thereof and said alcohol comprising ethylene glycol.

8. A gelation-resistant composition of at least pH of 9.0 comprising a major amount of an alcohol, a corrosion inhibiting amount of at least one water-soluble silicate represented by the formula:

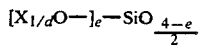

wherein X is a cation that forms a water-soluble silicate, d is the valence of the cation represented by X and has a value of at least one, and e has a value of 1 to 3 inclusive; and an effective silicate gelation stabilizing amount of at least one of a water-soluble salt of molybdic acid.

9. The composition of claim 8 wherein X is a cation selected from the group consisting of an alkali metal, ammonium, and tetraorganoammonium cations.

10. The process of inhibiting the corrosion of metal below sodium in the elecromotive series that come in contact with an aqueous liquid having a pH of at least 9.0 comprising adding to said liquid at least one water-soluble silicate represented by the formula:

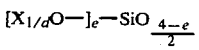

wherein X is a cation that forms a water-soluble silicate, d is the valence of the cation represented by x and has a value of at least one, and e has a value of 1 to 3 together with an effective silicate gelation stabilizing amount of a water soluble salt of molybdic acid.

11. The process of claim 10 wherein x is a cation selected from the group consisting of an alkali metal, ammonium, and tetraorganoammonium cations.

* * * * *